(12) United States Patent
Penn et al.

(10) Patent No.: US 6,609,484 B2
(45) Date of Patent: Aug. 26, 2003

(54) ENGINE COOLING SYSTEM

(75) Inventors: Aubery W. Penn, Washington, IL (US); David R. Berta, Varna, IL (US); Terry L. Schaffer, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/013,578

(22) Filed: Dec. 11, 2001

(65) Prior Publication Data

US 2003/0106502 A1 Jun. 12, 2003

(51) Int. Cl.[7] .................................................. F01P 3/00
(52) U.S. Cl. ................. 123/41.29; 123/41.31; 165/51
(58) Field of Search .......................... 123/41.29, 41.31; 165/51; 60/599

(56) References Cited

U.S. PATENT DOCUMENTS 5,353,757 A * 10/1994 Susa et al. ............... 123/41.29
6,158,399 A    12/2000 Ash et al. ................ 123/41.31

* cited by examiner

*Primary Examiner*—Noah P. Kamen
(74) *Attorney, Agent, or Firm*—Todd T Taylor

(57) ABSTRACT

An engine cooling system for a work machine or the like having an engine with a turbocharger and an aftercooler. A separate circuit aftercooler cooling circuit is provided. A radiator assembly includes a first group of radiator cores and a second group of radiator cores. Some coolant cooled in the first group of radiator cores is passed from the radiator assembly to an engine cooling circuit. Another portion of coolant cooled in the first group of radiator cores is passed to the second group of radiator cores, for additional cooling thereof. From the second group of radiator cores, coolant is passed to the separate circuit aftercooler cooling circuit.

18 Claims, 2 Drawing Sheets

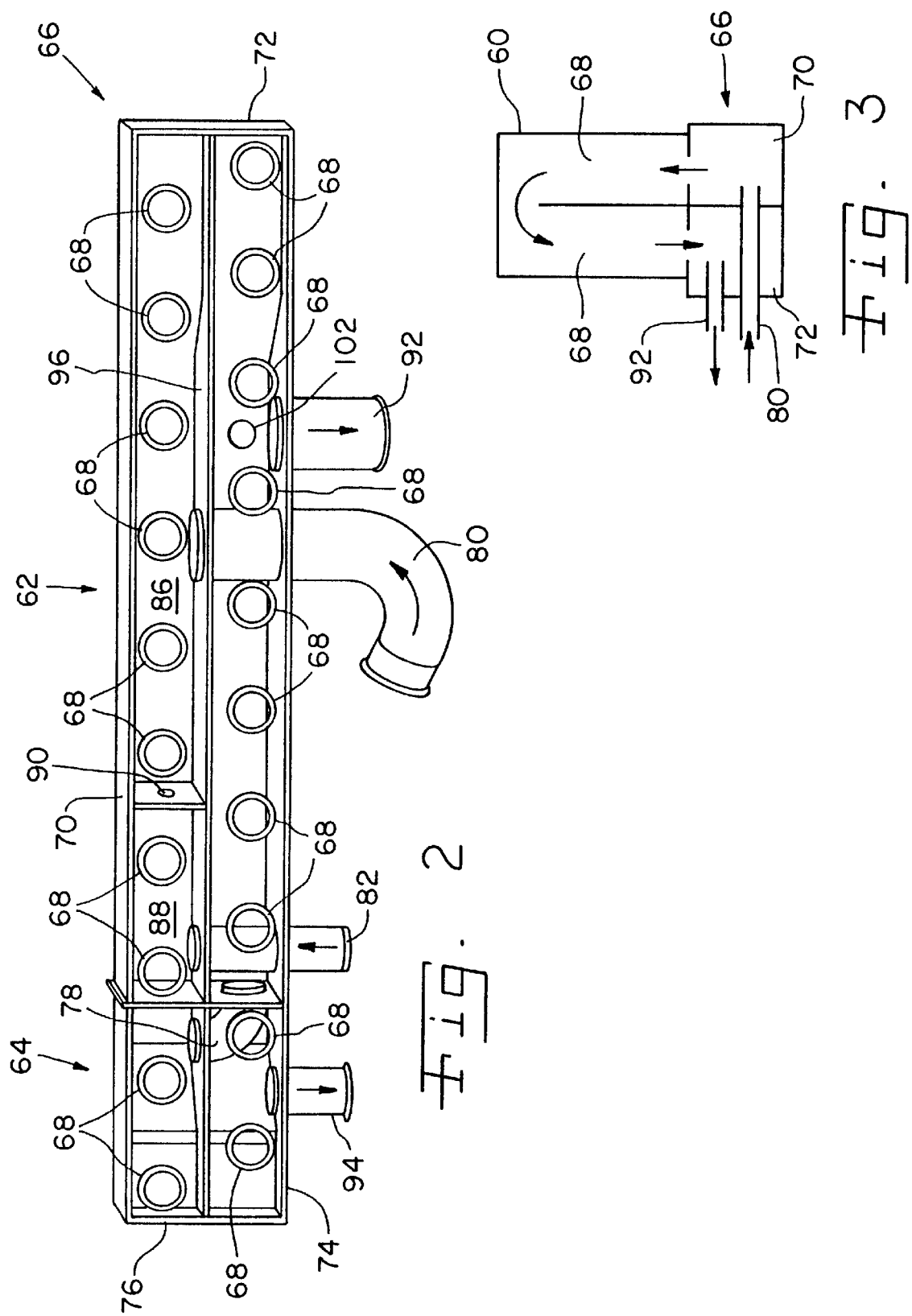

ENGINE COOLING SYSTEM

ENGINE COOLING SYSTEM

1. Technical Field

The present invention relates generally to cooling systems for internal combustion engines, and, more particularly, to cooling systems for internal combustion engines also having turbochargers with aftercoolers.

2. Background

Internal combustion engines used to operate heavy mechanical equipment, such as large tractors, generate considerable heat that must be dissipated. If not properly dissipated, heat reduces operating efficiency of the engine, and can ultimately lead to damage of the engine.

It is known to provide engine cooling systems which flow a coolant through the block of the engine to cool the engine. The coolant captures heat from the engine and releases the heat through a radiator in which the coolant passes in heat exchange relationship with air. The radiator includes a series of tubes through which the coolant is pumped, and airflow induced by a fan cools the tubes, and hence the coolant flowing through the tubes. The coolant is pumped through various engine components, such as the engine block, an engine oil cooler or the like, to capture heat from the components.

In the operation of an internal combustion engine, the amount of combustion air that can be delivered to the intake manifold of the engine, for combustion in the engine cylinders, is a limiting factor in the performance of the engine. Atmospheric pressure is often inadequate to supply the required amount of air for proper and efficient operation of an engine.

It is known to use one or more turbochargers for compressing air to be supplied to one or more combustion chambers within corresponding combustion cylinders. The turbocharger supplies combustion air at a higher pressure and higher density than existing atmospheric pressure and ambient density. The use of a turbocharger can compensate for lack of power due to altitude, or to increase the power that can be obtained from an engine of a given displacement, thereby reducing the cost, weight and size of an engine required for a given power output. The turbocharger typically includes a turbine driven by exhaust gases from the engine, and one or more compressors driven by the turbine through a turbocharger shaft common to both the turbine and the compressor or compressors. A stream of exhaust gases from the engine is conducted from the exhaust manifold to the turbine, and the exhaust gas stream passing through the turbine causes a turbine wheel to rotate. Rotation of the turbine wheel rotates the common shaft interconnecting the turbine wheel and one or more compressor wheels in the compressor section, thereby rotating the compressor wheels. Air to be compressed is received in the compressor section, wherein the air is compressed and supplied to the intake air system of the engine.

It is known to condition the boost air flowing from the compressor or compressors to affect the overall turbocharger performance and/or the engine efficiency. In turbochargers having multiple stage compressors, compressing the air in the first compressor significantly raises the temperature of the air, increasing the power required by the second compressor to achieve a desired pressure boost. To overcome the detrimental effects of the increase in temperature, so called "intercoolers" have been provided in the flow path between the first compressor outlet and the second compressor inlet. Similarly, so called "aftercoolers" have been used after the turbocharger in turbochargers having both single stage and multi-stage compressors. The aftercooler cools the compressed air being supplied to the intake manifold, thereby increasing the oxygen content per unit volume, to better support combustion in the cylinders and decrease engine operating temperatures.

It is known to supply coolant from the engine cooling system to circulate through the aftercooler, providing a heat exchange medium for the compressed air also flowing through the aftercooler. Heat from the compressed air stream is captured by the coolant and released in the readiator. Reducing the temperature of the charge air can reduce engine emissions and increase engine efficiency.

In an aftercooler system, it is known to provide a separate coolant circuit from the radiator to the aftercooler, including a separate circuit aftercooler (SCAC) pump for circulating the coolant to the aftercooler. However, the cooling efficiency of such systems have not always met expectations under all operating conditions.

A turbocharged engine cooling system using a two-pass radiator and a separate circuit aftercooler pump in an aftercooler cooling circuit is shown in U.S. Pat. No. 6,158,399.

In view of the engine efficiency and emissions reduction benefits obtained from adequate aftercooling of the combustion air, it is desirable to have an improved cooling system that provides adequate aftercooler cooling under various operating conditions.

The present invention is directed to overcoming one or more of the problems as set forth above.

SUMMARY OF THE INVENTION

In one aspect thereof, the present invention provides an internal combustion engine with a block defining a coolant channel, including a coolant channel inlet and a coolant channel outlet. A radiator assembly includes first and second groups of radiator cores, first and second radiator inlets and first and second radiator outlets. The first radiator inlet is coupled to the coolant channel outlet and the first radiator outlet is coupled to the coolant channel inlet. The first radiator outlet is associated with the first group of radiator cores, and the second radiator outlet is associated with the second group of radiator cores. A separate circuit aftercooler pump includes a pump inlet and a pump outlet. The pump inlet is coupled to the second radiator outlet. An aftercooler includes an aftercooler coolant inlet and an aftercooler coolant outlet. The aftercooler coolant inlet is coupled to the pump outlet and the aftercooler coolant outlet is coupled to the second radiator inlet.

In another aspect thereof, the present invention provides a cooling system for an internal combustion engine, with a radiator assembly including a first group of radiator cores and a second group of radiator cores, at least one radiator inlet and first and second radiator outlets. The first radiator outlet is associated with the first group of radiator cores, and the second radiator outlet is associated with the second group of radiator cores. A pump includes a pump inlet and a pump outlet. The pump inlet is coupled to the second radiator outlet. An aftercooler includes an aftercooler coolant inlet and an aftercooler coolant outlet, the aftercooler coolant outlet being coupled to the at least one radiator inlet.

In yet another aspect thereof, the present invention provides a method of cooling an internal combustion engine, having steps of providing an engine cooling circuit, a radiator having first and second groups of radiator cores, an aftercooler, a separate circuit aftercooler cooling circuit, and a heat transfer fluid; cooling the fluid in the radiator; flowing a portion of the fluid from the first group of radiator cores to the engine cooling circuit and back to the radiator; and flowing another portion of the fluid from the second group of radiator cores through the aftercooler and back to the radiator.

BRIEF DESCRIPTION OF THE DRAWINGS

FIG. 2 is a top plan view of the radiator bottom tank shown in FIG. 1; and

FIG. 3 is a side elevational, schematic illustration of the radiator shown in FIG. 2, illustrating the coolant flow through the radiator.

DETAILED DESCRIPTION

Figure 1:
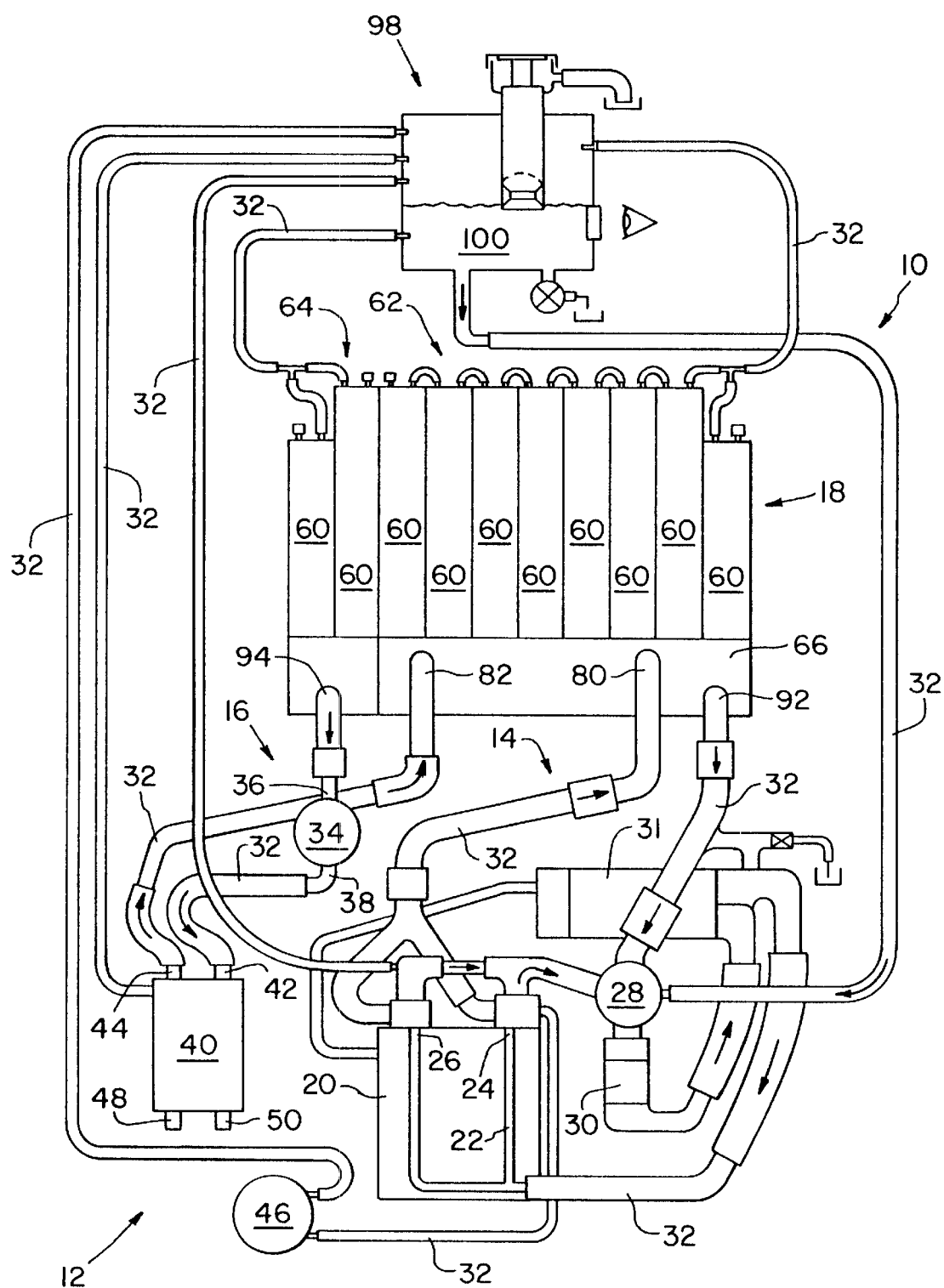
FIG. 1 is a schematic illustration of a preferred embodiment of the engine cooling system of the present invention.

Referring now more specifically to FIG. 1, an internal combustion engine cooling system 10 is shown, for and as part of an engine 12. Cooling system 10 includes an engine cooling circuit 14 and a separate circuit aftercooler (SCAC) cooling circuit 16. Common to engine cooling circuit 14 and SCAC cooling circuit 16 is a radiator assembly 18.

Engine 12 includes an engine block 20 having one or more coolant channels 22 provided therein, with a coolant channel inlet 24 and one or more coolant channel outlets 26. Block 20 further defines one or more combustion cylinders (not shown) in which fuel and air are combusted in a known manner, and engine 12 includes pistons, valves, manifolds and the like (not shown), descriptions of which are not necessary to an understanding of the present invention.

Engine cooling circuit 14 includes a jacket water pump 28, an engine oil cooler 30, transmission oil cooler 31, as well as various coolant conduits 32 and valves and sensors (not shown) well known to those skilled in the art.

SCAC cooling circuit 16 includes a SCAC pump 34 having an inlet 36 and an outlet 38. Various coolant conduits 32 are provided in SCAC cooling circuit 16, interconnecting the various components of SCAC cooling circuit 16. SCAC pump inlet 36 is connected in fluid flow communication to radiator assembly 18, as will be described in greater detail hereinafter, and SCAC pump outlet 38 is connected in fluid flow communication to an aftercooler 40. Aftercooler 40 includes a coolant inlet 42 and a coolant outlet 44. Coolant inlet 42 is connected in fluid flow communication to SCAC pump outlet 38, and coolant outlet 44 is connected in fluid flow communication to radiator assembly 18, as will be described in greater detail hereinafter. In aftercooler 40, coolant supplied thereto passes in heat exchange relationship with combustion air from a turbocharger 46 operated by combustion gases from engine 12. Aftercooler 40 includes a charge air inlet 48 and a charge air outlet 50. Charge air inlet 48 receives charge air from turbocharger 46 via a charge air conduit (not shown) and charge air outlet 50 is connected in flow communication to an intake manifold (not shown) of engine 12. Turbocharger 46 may be a single or multiple stage turbocharger, in any known manner or configuration, and a further description thereof is not necessary for an understanding of the present invention. Further, aftercooler 40 can be of any of various designs, and the details thereof are not necessary to an understanding of the present invention.

It will be understood by those skilled in the art that engine 12 includes numerous other engine systems, controls and the like, not shown in FIG. 1, which is merely a schematic illustration of the cooling circuitry of engine 12 necessary for understanding the present invention.

Radiator assembly 18 includes a plurality of radiator cores 60 which are divided into a first group 62 of radiator cores 60 and a second group 64 of radiator cores 60. A bottom tank 66 is provided for channeling and directing coolant flow from and to engine cooling circuit 14, SCAC cooling circuit 16 and radiator cores 60. Radiator cores 60 include coolant tubes 68, and may be provided as a dual pass radiator, in which coolant flows upwardly in a first tube 68 and downwardly in a second tube 68 from and to bottom tank 66. The tubes 68 of each core 60 in a dual pass configuration may be provided in a front and back relationship relative to the direction of airflow through the radiator. Coolant flows from bottom tank 66 upwardly through a back tube 68 and downwardly through a front tube 68 back into tank 66. The general pattern of coolant circulation through a dual pass radiator is shown schematically in FIG. 3. Air flows past and around tubes 68 in radiator cores 60 to effect heat transfer therebetween. Airflow may be induced by the operation of a fan (not shown).

As shown more clearly in FIG. 2, bottom tank 66 is divided into a plurality of compartments, including an inlet compartment 70, a first outlet compartment 72 and a second outlet compartment 74. First group 62 of radiator cores 60 receives coolant flow from inlet compartment 70 and provides coolant flow to first outlet compartment 72. Thus, first group 62 of cores 60 is in fluid flow communication between inlet compartment 70 and first outlet compartment 72. An intermediate compartment 76 is connected to first outlet compartment 72 by an internal channel or duct 78, to receive coolant flow from first outlet compartment 72. Second group 64 of radiator cores 60 is connected in flow communication between intermediate compartment 76 and second outlet compartment 74, and thereby receives coolant flow from intermediate compartment 76 and provides coolant flow to second outlet compartment 74.

Radiator assembly 18 further includes first and second radiator inlets 80 and 82, each connected in flow communication to inlet compartment 70.

First radiator inlet 80 receives coolant flow from engine 12 and second radiator inlet 82 receives coolant flow from aftercooler 40. Inlet compartment 70 may be provided with a baffle 74, separating inlet compartment 70 into an inlet compartment first section 86 and an inlet compartment second section 88. Baffle 84 is provided with an opening 90, providing controlled, limited flow between section 86 and section 88. First inlet section 86 is connected to first radiator inlet 80 and second inlet section 88 is connected to second radiator inlet 82.

Radiator assembly 18 includes a first radiator outlet 92 connected in flow communication between first outlet compartment 72 and engine cooling circuit 14, and a second radiator outlet 94 connected in flow communication between second outlet compartment 74 and SCAC cooling circuit 16.

In the configuration of radiator assembly 18 shown, inlet compartment 70 and intermediate compartment 76 are provided as back compartments behind first and second outlet compartments 72 and 74, which are front compartments relative to the direction of air flow through radiator assembly 18. First and second radiator inlets 80 and 82 approach bottom tank 66 from the front thereof, and extend through first outlet compartment 72 and an internal wall 96 of tank 66, to discharge directly into inlet compartment 70 and, more specifically, into first and second sections 86 and 88 thereof, respectively. However, it should be understood that the approach of inlets 80 and 82 to bottom tank 66 can be different from that shown, such as from the back thereof directly into inlet compartment 70, without departing from the scope of the present invention.

A shunt tank assembly 98 is provided, connected in known manner to radiator assembly 18, engine cooling circuit 14 and SCAC cooling circuit 16, to provide a reservoir of and overflow compartment for heat transfer fluid or coolant 100 circulated through out engine cooling system 10.

INDUSTRIAL APPLICABILITY

During use of engine cooling system 10, engine 12 is operated in known manner, with the resultant and unavoidable generation of heat. Engine 12 further operates turbocharger 46, to compress charge air which is then passed through aftercooler 40, for cooling thereof Radiator assembly 18 provides coolant to both engine cooling circuit 14 and SCAC cooling circuit 16, to cool engine 12, as well as the charge air passing through aftercooler 40.

Coolant from inlet compartment 70 of bottom tank 66 flows upwardly through first group 62 of radiator cores 60, and then downwardly therein, into first outlet compartment 72. A portion of the coolant from first outlet compartment 72 is provided to engine cooling circuit 14, in known manner. Another portion of coolant from first outlet compartment 72 flows through internal channel or duct 78 to intermediate compartment 76. From intermediate compartment 76, coolant flows upwardly through second group 64 of radiator cores 60, and then downwardly therein into second outlet compartment 74. From second outlet compartment 74, coolant is supplied via SCAC pump 34 to aftercooler 40.

Coolant returning from engine cooling circuit 14 flows through first radiator inlet 82 into inlet compartment 70, and specifically into first section 86 of inlet compartment 70. Coolant returning from SCAC cooling circuit 16 flows through second radiator inlet 82 into inlet compartment 70, and specifically into second section 88 of inlet compartment 70.

The present invention provides improved cooling for a separate circuit aftercooler cooling circuit, in that a section of radiator cores is provided dedicated to cooling coolant to be supplied to the separate circuit aftercooler cooling circuit. Further, coolant supplied to the separate circuit aftercooler cooling circuit is provided with additional cooling, the coolant first having passed through a first group of radiator cores and thereafter passing through the second set of dedicated radiator cores for the separate circuit aftercooler cooling circuit.

Other aspects, objects and advantages of this invention can be obtained from a study of the drawings, the disclosure and the appended claims.

What is claimed is:

1. An internal combustion engine, comprising:
    a block defining a coolant channel and including a coolant channel inlet and a coolant channel outlet, said coolant channel inlet being an entrance to said coolant channel and said coolant channel outlet being an exit from said coolant channel;
    a radiator assembly including first and second groups of radiator cores, first and second radiator inlets and first and second radiator outlets, said first radiator inlet coupled to said coolant channel outlet and said first radiator outlet coupled to said coolant channel inlet, said first radiator outlet associated with said first group of radiator cores and said second radiator outlet associated with said second group of radiator cores, said second group of radiator cores coupled to receive a coolant flow from said first group of radiator cores;
    a separate circuit aftercooler pump including a pump inlet and a pump outlet, said pump inlet coupled to said second radiator outlet; and
    an aftercooler including an aftercooler coolant inlet and an aftercooler coolant outlet, said aftercooler coolant inlet coupled to said pump outlet and said aftercooler coolant outlet coupled to said second radiator inlet.

2. The internal combustion engine of claim 1, including a radiator bottom tank having an inlet compartment coupled to said first and second radiator inlets, a first outlet compartment coupled to said first radiator outlet and a second outlet compartment coupled to said second radiator outlet.

3. The internal combustion engine of claim 2, said tank having a baffle separating said inlet compartment into first and second sections, with restricted flow therebetween, said first radiator inlet coupled to said first section and said second radiator inlet coupled to said second section.

4. The internal combustion engine of claim 2, said first group of cores fluidly coupled between said inlet compartment and said first outlet compartment.

5. The internal combustion engine of claim 2, said tank having an intermediate compartment coupled to said first outlet compartment, said second group of cores coupled in flow communication between said intermediate compartment and said second outlet compartment.

6. The internal combustion engine of claim 5, said first group of cores fluidly coupled between said inlet compartment and said first outlet compartment.

7. A cooling system for an internal combustion engine, comprising:
    a radiator assembly including a first group of radiator cores and a second group of radiator cores, at least one radiator inlet and first and second radiator outlets, said first radiator outlet associated with said first group of radiator cores and said second radiator outlet associated with said second group of radiator cores, said second group of radiator cores coupled to receive a coolant flow from said first group of radiator cores;
    a separate circuit aftercooler pump including a pump inlet and a pump outlet, said pump inlet coupled to said second radiator outlet; and
    an aftercooler including an aftercooler coolant inlet and an aftercooler coolant outlet, said aftercooler coolant outlet coupled to said at least one radiator inlet.

8. The cooling system of claim 7, including a radiator tank having an inlet compartment coupled with said at least one radiator inlet, a first radiator outlet compartment coupled to said first radiator outlet and a second outlet compartment coupled to said second radiator outlet.

9. The cooling system of claim 7, said tank having an intermediate compartment in fluid flow communication between said first outlet compartment and said second group of radiator cores.

10. The cooling system of claim 8, said first group of radiator cores in flow communication between said inlet compartment and said first outlet compartment.

11. The cooling system of claim 8, said tank having a baffle separating said inlet compartment into first and second sections, with restricted flow therebetween.

12. The cooling system of claim 10, said at least one radiator inlet including a first inlet coupled with said first section of said inlet compartment and a second inlet coupled with said second section of said inlet compartment, and said aftercooler coolant outlet coupled to said second radiator inlet.

13. A method of cooling an internal combustion engine, comprising the steps of:
  providing an engine cooling circuit, a radiator assembly having first and second groups of radiator cores, an aftercooler, a separate circuit aftercooler cooling circuit, and a heat transfer fluid;
  cooling said fluid in said radiator assembly;
  flowing a portion of said fluid from said first group of radiator cores to the engine cooling circuit and back to the radiator assembly; and
  flowing another portion of said fluid from said first group of radiator cores to said second group of radiator cores, through said aftercooler, and back to said first group of radiator cores.

14. The method of cooling of claim 13, including the step of providing a separate circuit aftercooler pump; and
  flowing fluid from said radiator assembly to said aftercooler and from said aftercooler to said radiator assembly using said pump.

15. The method of cooling of claim 13, including the step of flowing said another portion of said fluid from said first group of radiator cores to said second group of radiator cores.

16. The method of cooling of claim 13, including the steps of:
  providing a dual pass radiator assembly having an inlet compartment and first and second outlet compartments;
  flowing said fluid from the inlet compartment through said first group of radiator cores and into said first outlet compartment; and
  flowing said another portion of said fluid from said first outlet compartment through said second group of radiator cores and to said second outlet compartment.

17. The method of cooling of claim 16, including the step of providing a separate circuit aftercooler pump and flowing fluid from said radiator assembly to said aftercooler and from said aftercooler to said radiator assembly using said pump.

18. The method of cooling of claim 13, including the step of operably coupling a shunt tank assembly with said radiator assembly and said aftercooler.

* * * * *